United States Patent
McGough

[11] Patent Number: 5,685,413
[45] Date of Patent: Nov. 11, 1997

[54] ADJUSTABLE PALLET FOR SUPPORTING WORK PIECES

[75] Inventor: Taggert Ryan McGough, Montgomery County, Ohio

[73] Assignee: Odawara Automation, Inc., Tipp City, Ohio

[21] Appl. No.: 527,191

[22] Filed: Sep. 12, 1995

[51] Int. Cl.[6] .................................................. B65G 37/00
[52] U.S. Cl. ........................ 198/803.01; 29/33 P
[58] Field of Search ................... 198/803.01, 803.2; 29/33 P

[56] References Cited

U.S. PATENT DOCUMENTS

| | | |
|---|---|---|
| 140,404 | 7/1873 | Coe. |
| 957,721 | 5/1910 | Troup. |
| 1,318,057 | 10/1919 | Dean. |
| 1,403,997 | 1/1922 | Aeschbach. |
| 3,222,055 | 12/1965 | Cook ................................. 269/219 |
| 3,240,485 | 3/1966 | Oser ................................. 269/305 |
| 3,880,074 | 4/1975 | Seifert ............................... 101/38 |
| 4,002,328 | 1/1977 | Wolf et al. ......................... 269/97 |
| 4,477,064 | 10/1984 | DiGiulio ............................ 269/231 |
| 4,489,926 | 12/1984 | Blatrix .............................. 269/93 |
| 4,492,301 | 1/1985 | Inaba et al. ........................ 198/472 |
| 4,557,371 | 12/1985 | Yonezawa ....................... 198/803.01 |
| 4,667,804 | 5/1987 | Dubuit et al. ...................... 198/345 |
| 4,698,475 | 10/1987 | Lothenbach et al. ............... 219/69 |
| 4,713,883 | 12/1987 | Santandrea et al. ................. 29/736 |
| 4,768,727 | 9/1988 | Santandrea et al. ............... 242/7.05 |
| 4,787,505 | 11/1988 | Tweedy ........................... 198/803.01 |
| 4,946,021 | 8/1990 | Murphy ............................. 198/375 |
| 4,965,924 | 10/1990 | Santandrea et al. ................. 29/596 |
| 5,060,780 | 10/1991 | Santandrea et al. ............... 198/345.1 |
| 5,060,781 | 10/1991 | Santandrea et al. ............... 198/345.1 |
| 5,065,499 | 11/1991 | Luciano et al. .................... 29/799 |
| 5,092,454 | 3/1992 | Carlson ........................... 198/803.01 |
| 5,099,978 | 3/1992 | Santandrea ...................... 198/345.1 |
| 5,099,979 | 3/1992 | Kehrel ............................ 198/345.1 |
| 5,115,901 | 5/1992 | Santandrea et al. ............... 198/345.3 |
| 5,240,235 | 8/1993 | Santandrea et al. ................. 269/50 |
| 5,244,082 | 9/1993 | Tagashi ........................... 198/803.01 |
| 5,255,778 | 10/1993 | Santandrea et al. .............. 198/803.11 |
| 5,346,058 | 9/1994 | Santandrea et al. .............. 198/803.01 |
| 5,348,142 | 9/1994 | Nishimura et al. ............... 198/803.01 |
| 5,373,623 | 12/1994 | Santandrea et al. ................. 29/596 |

FOREIGN PATENT DOCUMENTS

| | | | |
|---|---|---|---|
| 0348715B1 | 9/1989 | European Pat. Off. | .......... B23Q 7/14 |
| 0447805A2 | 2/1991 | European Pat. Off. | .......... B23Q 7/14 |

*Primary Examiner*—Joseph E. Valenza
*Attorney, Agent, or Firm*—Thompson Hine & Flory LLP

[57] ABSTRACT

An adjustable pallet for supporting work pieces having a carriage rod mounted on the pallet; and a pair of support member. At least one the support members is mounted for travel on the carriage rod. The support member, which is mounted for travel, includes a spring having a helical portion which encircles the carriage rod and engages the carriage rod when the spring is relaxed, thereby fixing the position of the support member on the pallet, and disengages from the carriage rod when the spring is compressed, thereby enabling the position of the support member to be adjusted.

17 Claims, 3 Drawing Sheets

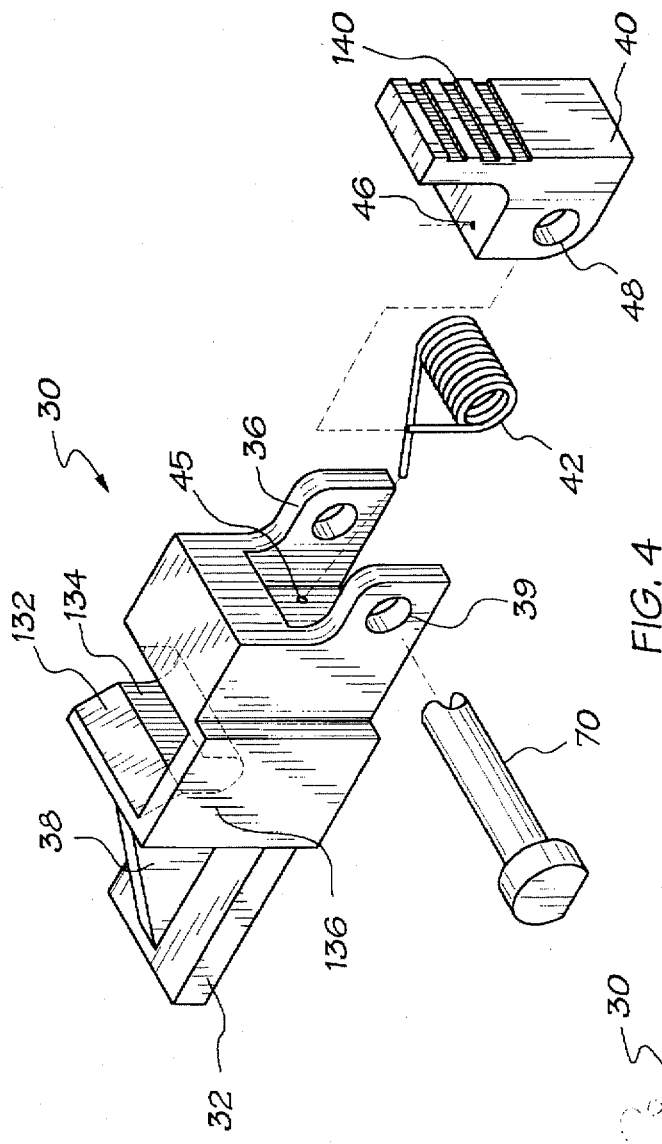
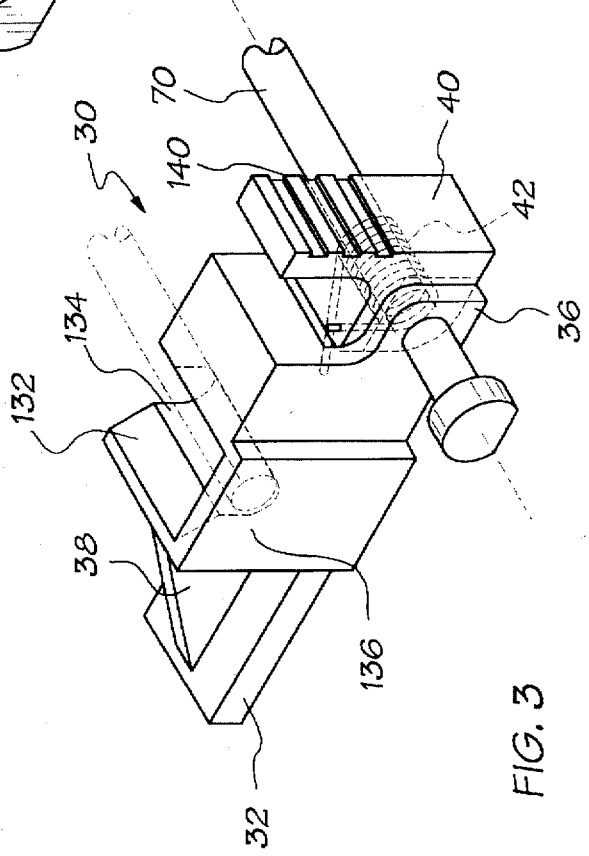

ADJUSTABLE PALLET FOR SUPPORTING WORK PIECES

FIELD OF THE INVENTION

The present invention relates to an adjustable apparatus for supporting work pieces in an automated assembly production line.

BACKGROUND

Apparatuses for supporting work pieces for use in an automated assembly production line are known in the art. Examples of these apparatuses can be found in U.S. Pat. Nos. 4,787,505; 4,492,301; 5,060,780; 5,099,978; 5,115,901; and 5,348,142.

Pallet conveyor systems are commonly used in automated assembly production lines. A work piece that is to be assembled, machined or operated on rests on supports which are mounted on the pallet. The pallet serves as both a support for the part to be assembled and also as a means for transporting the part from one assembly station to the next. To move from one assembly station to the next, a conveyor system usually transports the pallet and the part along the assembly line in which separate workstations perform specific operations on the part. Typically, these production processes employ a plurality of pallets and workstations.

In a typical system, a belt conveyor frictionally engages the pallet and moves the pallet from one assembly station to the next. When the pallet arrives at a workstation, the pallet is stopped and the workstation begins its operation. To work on the part, the workstation either removes the part from the pallet, works on the part as it rests on the pallet or removes the entire pallet from the conveyor to perform its work operations. When the workstation concludes its operation, it returns the part to the pallet and the pallet is released to continue down the assembly line. If the entire pallet is removed from the assembly line for a work operation, the pallet is replaced on the conveyor to continue down the assembly line to the next workstation.

SUMMARY OF THE INVENTION

The present invention provides an adjustable pallet for supporting work pieces of varying sizes. The adjustable pallet of this invention can be used with automated assembly work piece production lines.

The adjustable pallet of this invention comprises a pallet, a carriage rod mounted on the pallet and a pair of support members mounted on the rod. The surface of each support member is designed to retain a work piece in position on the support member. In one embodiment of the invention, one of the support members is mounted for travel along the carriage rod and the other is fixed to the surface of the pallet. Because one of the support members is movable in relation to the other fixed support member, the distance between the two support members can be adjusted to accommodate work pieces of differing sizes. The movable support member includes a spring having a helical portion which encircles and frictionally engages the carriage rod. When the spring is compressed, it disengages from the rod allowing the support member to be moved along the rod.

In a second embodiment of the invention, both support members can be moved along the rod. In this embodiment, each of the support members includes a spring which can be compressed so that the work piece support members can travel along the rod to adjust the lateral distance between the two support members to accommodate work pieces of differing sizes. This second embodiment is particularly useful when the pallet has a center aperture which allows the work piece to be worked on from above or below. With both support members being adjustable, the support members can be adjusted to maintain the work piece in a constant position on the pallet so that work operations may be performed on specific portions of the part.

BRIEF DESCRIPTION OF THE DRAWINGS

FIG. 3 presents a perspective view of a support member of the adjustable pallet of this invention; and FIG. 4 presents an exploded view of the work piece support member pictured in FIG. 3.

DETAILED DESCRIPTION OF THE INVENTION

Figure 1:
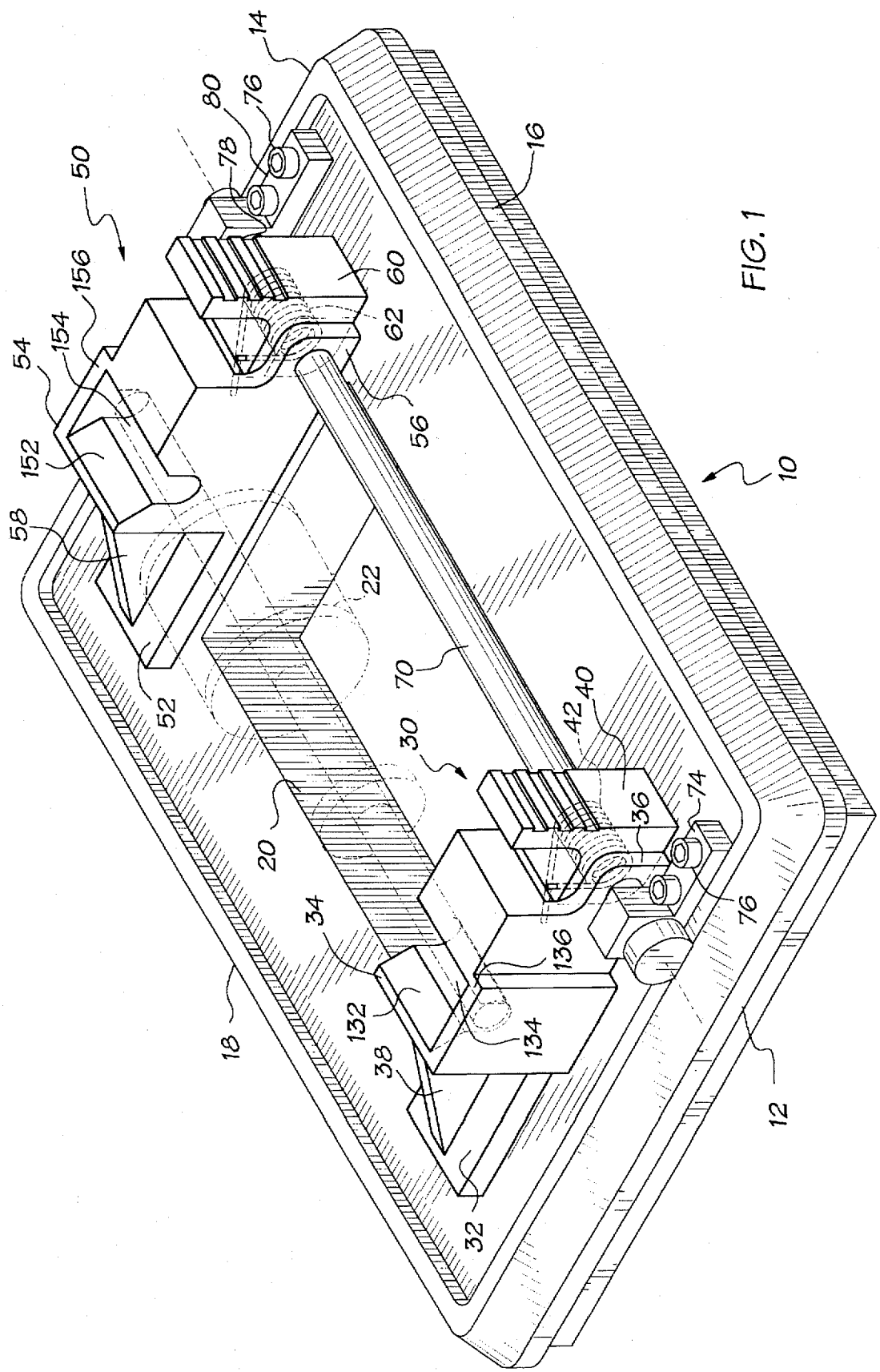
FIG. 1 presents a perspective view of the adjustable pallet of the invention.

FIG. 1 presents a perspective view of the adjustable pallet 10 of this invention. The pallet 10 includes a first end 12, a second end 14, a first side 16 and a second side 18. First end 12, second end 14, first side 16 and second side 18 surround an optional aperture 20 in the center of the pallet 10. First support member 30 and second support member 50 are mounted on carriage rod 70, which is mounted on the pallet 10.

Figure 2:
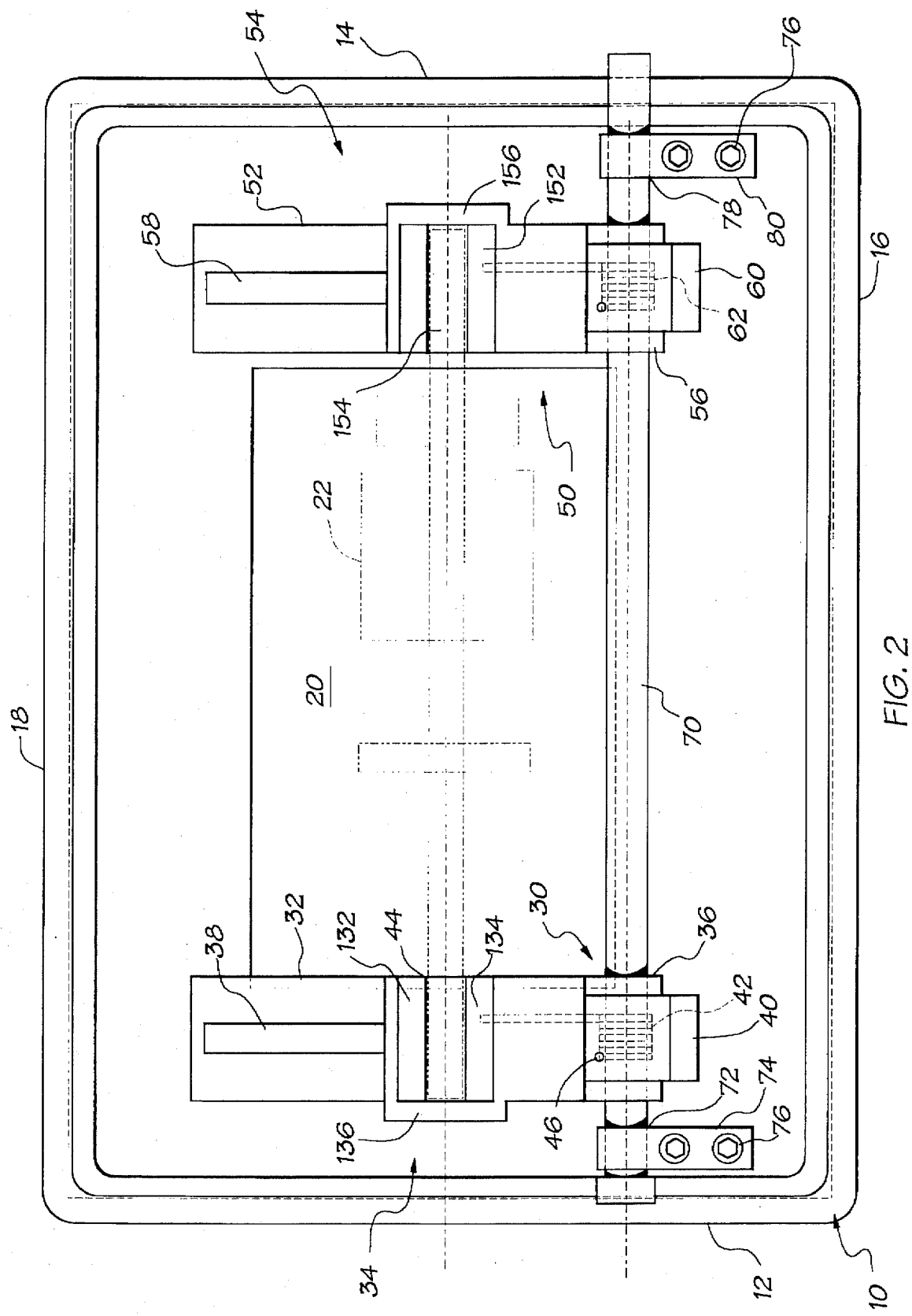
FIG. 2 presents a plan view of the adjustable pallet of this invention.

As shown in FIG. 1 and FIG. 2, which presents a plan view of the pallet 10, first support member 30 and second support member 50 are mounted for lateral movement on carriage rod 70. First support member 30 includes a rectangularly shaped base 32 which is engaged by a clip arm 40. Clip arm 40 slidably engages rod 70. Support surface 34 extends upwardly from base 32. Arms 36 extend from base 32 and slidably engage carriage rod 70. Wall 38 engages both base 32 and support surface 34 to reinforce support surface 34, as described below. Pivot arm 48 extends perpendicularly from clip arm 40. Spring 42 frictionally encircles carriage rod 70. The two ends of spring 42 are retained in base 32 and clip 40, respectively. Second support member 50 includes a rectangularly shaped base 52 which is engaged by a clip arm 60. Support surface 54 extends upwardly from base 52. Arms 56 extend from base 52 and slidably engage carriage rod 70. Wall 58 engages both base 52 and support surface 54 to reinforce support surface 54. Clip arm 60 detachably engages base 52 and is slidably mounted on rod 70. Spring 62 frictionally engages rod 70. The two ends of spring 62 are retained in base 52 and clip arm 60, respectively. Preferably, springs 42 and 62 are torsion springs.

As shown in FIG. 2, rod mount 74 located at the first end 12 of the pallet 10 and rod mount 80 is located at the second end 14 of the pallet 10. Aperture 72 is formed in rod mount 74 and aperture 78 is formed in rod mount 80. Carriage rod 70 is mounted on pallet 10 through aperture 72 in rod mount 74 and aperture 78 in rod mount 80. Both rod mount 74 and rod mount 80 are fastened to the surface of pallet 10 by means of fasteners 76. Fasteners 76 may be any conventional type of fasteners such as screws, hex screws, bolts or any other similar fastening device.

As shown in FIGS. 1 and 2, wall 38 extends from the surface of base 32 and engages the outside of work piece support surface 34. Wall 38 supports the outside of support surface 34 while a work operation is being performed on the work piece and provides support for support surface 34 as a work piece is being removed from and placed onto support surface 34. Wall 38 also provides support for support surface 34 during the adjustment of support member 30.

A view of the work piece support surface 34 of support member 30 can also be seen in FIG. 1. For illustration purposes, a work piece 22 is shown in phantom lines in FIG. 1. As can be seen in FIG. 1, support surface 34 of support member 30 is shaped to receive work piece 22 and retain it in position for a work operation. Work piece support surface 34 has a mouth 132, a trough 134 and a retaining wall 136. Mouth 132 opens into trough 134. Mouth 132 is wider than trough 134 to provide for proper insertion of a work piece through mouth 132 and into trough 134. Mouth 132 and trough 134 can have any shape which will allow for proper insertion of a work piece into work piece support surface 34. Typically, mouth 132 will be narrower at its bottom than at its top to act as a guide for proper insertion of work piece 22. Typically, trough 134 will have either a V-shape or an U-shape to maintain the work piece in position on support surface 34. One skilled in the art will appreciate that the shape of mouth 132 and trough 134 will vary depending on the type and size of the particular work piece on which the work operations are being performed.

A view of the work piece support surface 54 of support member 50 can also be seen in FIG. 1. Similar to support surface 34, support surface 54 of support member 50 is shaped to receive work piece 22 and retain it in position for a work operation. Work piece support surface 54 has a mouth 152, a trough 154 and a retaining wall 156. Mouth 152 opens into trough 154. Mouth 152 is wider than trough 154 to provide for proper insertion of a work piece through mouth 152 and into trough 154. Mouth 152 and trough 154 can have any shape which will allow for proper insertion of a work piece into work piece support surface 54. Typically, mouth 152 will be narrower at its bottom than at its top to act as a guide for proper insertion of work piece 22. Typically, trough 154 will have either a V-shape or an U-shape to maintain the work piece in position on support surface 54. One skilled in the art will appreciate that the shape of mouth 152 and trough 154 will vary depending on the type and size of the particular work piece on which the work operations are being performed.

Wall 136 and wall 156 are optionally provided as a means for retaining work piece 22 in proper position in troughs 134 and 154, respectively. Walls 136 and 156 prevent work piece 22 from moving or being moved toward either end 12 or end 14 of pallet 10 during a work operation so that it is maintained in a constant position on pallet 10. This retaining feature is particularly useful when pallet 10 contains an aperture 20 because the retained work piece 22 will be maintained in a constant position relative to aperture 20. One skilled in the art will appreciate that both wall 136 on support surface 34 and wall 156 on support surface 54 can be positioned so that work piece 22 would be prevented from any lateral motion in relation to pallet 10, and in particular, in relation to aperture 20.

A perspective view of first support member 30 is shown in FIG. 3 and FIG. 4 shows an exploded view of the support member pictured in FIG. 3. Although only support member 30 is shown in FIGS. 3 and 4, one skilled in the art will appreciate that the view of one support member illustrates the other. As shown in FIG. 4, each arm 36 of base 32 has an aperture 39, therein. Pivot arm 40 also has an aperture 48 which aligns with apertures 39 in arms 36 of base 32. Pivot arm 40 slidably engages arms 36 of base 32. Torsion spring 42 has a helical portion which encircles carriage rod 70 and engages base 32 through a first aperture 45 and clip arm 40 through a second aperture 46. Clip arm 40 may optionally include a grip region 140 to facilitate adjustment of support member 30 as discussed below.

A view of carriage rod 70 can also be seen in FIG. 3. Carriage rod 70 has a circular cross section but carriage rod 70 may have any type of cross section which would provide for proper adjustment of support members 30 and 50. For example, carriage rod 70 could also have a square cross section and still function properly with this invention.

Spring 42 maintains support member 30 in position on pallet 10. Spring 42 includes a helical portion which encircles carriage rod 70. The inside diameter of the helical portion of spring 42 measures slightly less than the outside diameter of carriage rod 70 when spring 42 is in a relaxed state. When spring 42 is relaxed, the difference in diameters between spring 42 and carriage rod 70 produces a frictional engagement between spring 42 and carriage rod 70. This frictional engagement between spring 42 and carriage rod 70 causes spring 42 to engage carriage rod 70 and inhibit the lateral movement of support member 30 along carriage rod 70.

To move support member 30 along rod 70, spring 42 is compressed to release it from its frictional engagement with rod 70, as described in detail below. When spring 42 is compressed, the inside diameter of the helical portion becomes greater than the outside diameter of carriage rod 70. Once spring 42 is compressed, support member 30 can freely travel along carriage rod 70. After support member 30 is moved to its desired position, spring 42 is relaxed. When spring 42 is relaxed, the inside diameter of the helical portion becomes less than the outside diameter of carriage rod 70 producing the frictional engagement between spring 42 and carriage rod 70. Spring 42 allows support member 30 to be adjusted, as discussed above, to a position on carriage rod 70 which corresponds with the size of the work piece upon which work is being performed. Once adjusted to that particular position on carriage rod 70, spring 42 inhibits support member 30 from moving while the work piece is being worked upon or transported on pallet 10.

In the first embodiment of this invention, one of the support members is mounted for travel on carriage rod 70 and the other is fastened to the surface of pallet 10. For purposes of illustration of the first embodiment, first support member 30 will be described as being mounted for travel along carriage rod 70 and second support member 50 will be described as being fastened to pallet 10.

Support member 30 can be adjusted in relation to support member 50 to accommodate work pieces of differing sizes. To move support member 30, spring 42 must be compressed to disengage spring 42 from carriage rod 70. To compress spring 42, clip arm 40 is moved toward base 32. This action causes an angular force on spring 42 which compresses spring 42. Once spring 42 has been compressed, support member 30 may be moved either toward or away from support member 50 along carriage rod 70 to provide the desired distance between the two supports to accommodate a new work piece. After support member 30 has been moved to a predetermined position, clip arm 40 is released causing spring 42 to relax and engage carriage rod 70 to maintain support member 30 at that particular position. Once support member 30 has been moved to its predetermined position, a work piece can then be placed into position on the support surfaces 34 and 54, respectively.

Spring 42 also provides biasing force to maintain support members 30 in position on pallet 10 and prevent support members 30 from moving during transport of a work piece. First end 44 of spring 42 engages base 32 through aperture 45. The second end 46 of spring 42 engages aperture 46 in clip arm 40. Spring 42 urges clip arm 40 toward the surface of pallet 10 increasing the frictional engagement between clip arm 40 and the surface of pallet 10.

In the first embodiment, the second support member 50 is fastened to the surface of pallet 10. The second support member 50 can be fastened to the surface of pallet 10 by any conventional fastening means such as screws, hex screws, bolts, rivets and the like. In this embodiment, second support member 50 may even be molded as part of the pallet 10.

In a second embodiment of the invention, both support members 30 and 50 are adjustable relative to each other. In this second embodiment support member 50 has a similar configuration to that of support member 30. Support member 50 is moved in a manner similar to that used to move support member 30. Clip arm 60 is moved toward base 52 of second support member 50. This movement causes an angular force to be applied to spring 62. This angular force causes spring 62 to compress which allows base 52 to be moved along carriage rod 70. Once support member 50 is moved to a predetermined position, clip arm 60 is released and spring 62 engages carriage rod 70 holding base 52 in position. After both support members 30 and 50 have been moved to their predetermined positions, a work piece can then be placed into position on support surfaces 34 and 54, respectively.

Although support member 30 has been described herein as being the only movable work piece or as the first support member moved, one skilled in the art will appreciate that either one of the support members, 30 or 50, can be fixed to the pallet 10 and that either one of the support members, 30 or 50, can be adjusted first or that they can both be adjusted simultaneously. One skilled in the art will also understand that the above described adjustment of support members 30 and 50 can be performed either manually or automatically. In an automated adjustment of support members 30 and 50, support members 30 and 50 can adjusted separately or simultaneously.

To facilitate work pieces of differing sizes and dimensions, support members 30 and 50 can be removed from the pallet 10 and replaced with different support members having differently sized and/or shaped support surfaces 34 and 54, respectively. To remove support members 30 and 50 from the pallet, fasteners 76 must be removed from pallet 10. Once the fasteners 76 have been removed, the first rod mount 74 can be removed from the end of carriage rod 70 and pallet 10. After removing first rod mount 74, second rod mount 80 is removed. Fasteners 76 are removed and second rod mount 80 is removed from pallet 10. Once rod mount 74 and rod mount 80 are unfastened from pallet 10, rod mount 80 is slid off rod 70. After rod mount 80 is removed from rod 70, work piece support members 30 and 50 are removed from rod 70. After support members 30 and 50 are removed from carriage rod 70, the new support members are placed onto carriage rod 70. Once the new support members are in position on carriage rod 70, rod mount 80 is replaced on rod 70. Finally, rod mount 72 is placed on carriage rod 70 and secured to the surface of pallet 10 by fasteners 76. Rod mount 80 is also placed on carriage rod 70 and secured to the surface of pallet 10 by fasteners 76.

As stated above, work can be performed on work piece 22 as it rests on pallet 10 or by removing work piece 22 from pallet 10. If work piece 22 is worked on as it rests on pallet 10, pallet 10 may include optional aperture 20. Aperture 20 allows work to be performed on work piece 22 from either above or below pallet 10. Alternately, pallet 10 can be removed from the production line and then work piece 22 can be worked on while resting upon the pallet 10. To facilitate the use of pallet 10 in this type of operation, pallet 10 may be equipped with optional apertures which are provided as a means to lift pallet 10 off of the assembly line in an automated assembly line process. Typically, a workstation will engage the apertures and lift pallet 10 from the conveyor to the workstation. Once the work operation is completed, pallet 10 is replaced onto the conveyor. One skilled in the art will appreciate that these two examples are provided for illustrative purposes only and are not intended to limit the possible uses for this pallet.

Having described the invention in detail and by reference to preferred embodiments thereof, it will be apparent that modifications and variations are possible, without departing from scope of the invention described in the appended claims.

What is claimed is:

1. An adjustable pallet for supporting work pieces comprising:

a pallet;

a carriage rod mounted on the pallet; and a pair of support members;

wherein at least one of the support members is mounted for travel on the carriage rod and that support member, which is mounted for travel, includes a spring having a helical portion which encircles the carriage rod and engages the carriage rod when the spring is relaxed, thereby fixing the position of the support member on the pallet, and disengages from the carriage rod when the spring is compressed, thereby enabling the position of the support member to be adjusted.

2. The adjustable pallet of claim 1 wherein the support member, which travels on the carriage rod, further comprises:

a base having a bore therein through which the carriage rod passes; and a clip arm having an aperture therein through which the carriage rod passes, the clip arm engaging the spring; wherein the base and the clip arm are mounted to pivot in relation to each other such that upon pivoting the clip arm toward the base, an angular force is applied to the spring to compress the spring and disengage it from the carriage rod.

3. The adjustable pallet of claim 2 wherein each support member includes a work piece support surface shaped to prevent lateral movement of the work piece as it rests on the pallet.

4. The adjustable pallet of claim 3 wherein the carriage rod is removably mounted on the pallet so that the support members can be removed from the pallet and replaced with support members having differing sizes and support surfaces to accommodate work pieces of differing sizes and shapes.

5. The adjustable pallet of claim 4 wherein the pallet includes a centrally located aperture such that the support members support the work piece above the aperture to allow the work piece to be accessed from above and below the pallet.

6. The adjustable pallet of claim 5 wherein the carriage rod has a circular cross section.

7. The adjustable pallet of claim 6 wherein the spring is a torsion spring.

8. The adjustable pallet of claim 1 wherein both of the support members are mounted for travel on the carriage rod and each support member includes a spring having a helical portion which encircles the carriage rod and engages the carriage rod when the spring is relaxed, thereby fixing the position of the support member or the pallet, and disengages from the carriage rod when the spring is compressed, thereby enabling the position of the support member to be adjusted.

9. The adjustable pallet of claim 8 wherein each support member further comprises:

a base having a bore therein through which the carriage rod passes; and a clip arm having an aperture therein through which the carriage rod passes, the clip arm engaging the spring;

wherein the base and the clip arm are mounted to pivot in relation to each other such that upon pivoting the clip arm toward the base, an angular force is applied to the spring to compress the spring and disengage it from the carriage rod.

10. The adjustable pallet of claim 9 wherein each support member includes a work piece support surface shaped to prevent lateral movement of the work piece as it rests on the pallet.

11. The adjustable pallet of claim 10 wherein the carriage rod is removably mounted on the pallet so that both support members can be removed from the pallet and replaced with support members having differing sizes and support surfaces to accommodate work pieces of differing sizes and shapes.

12. The adjustable pallet of claim 11 wherein the pallet includes a centrally located aperture such that the support members support the work piece above the aperture to allow the work piece to be accessed from above and below the pallet.

13. The adjustable pallet of claim 12 wherein the carriage rod has a circular cross section.

14. The adjustable pallet of claim 13 wherein the spring is a torsion spring.

15. A method for adjusting an adjustable pallet for work pieces comprising the steps of:

providing an adjustable pallet comprising a pallet;

a carriage rod mounted on the pallet; and a pair of support members, wherein at least one of the support members is mounted for travel on the carriage rod and that support member includes a spring having a helical portion which encircles the carriage rod and engages the carriage rod when the spring is relaxed and disengages from the carriage rod when the spring is compressed;

determining the position of the support members laterally in relation to each other; and adjusting the lateral position of the support members in relation to each other by moving the at least one support member along the carriage rod to provide a differing support space for a work piece.

16. The method of claim 15 wherein both support members are slidably mounted on the carriage rod and adjustable to accommodate work pieces of differing sizes.

17. The method of claim 16 wherein each of the members further comprises:

a base having a bore therein through which the carriage rod passes; and a clip arm having an aperture therein through which the carriage rod passes, the clip arm engaging the spring;

wherein the base and the clip arm are mounted to pivot in relation to each other such that upon pivoting the clip arm toward the base, an angular force is applied to the spring to compress the spring and disengage it from the carriage rod.

* * * * *